Feb. 28, 1933.　　　T. L. BRANNEN　　　1,899,256
DRIER ROLL
Filed Sept. 6, 1930
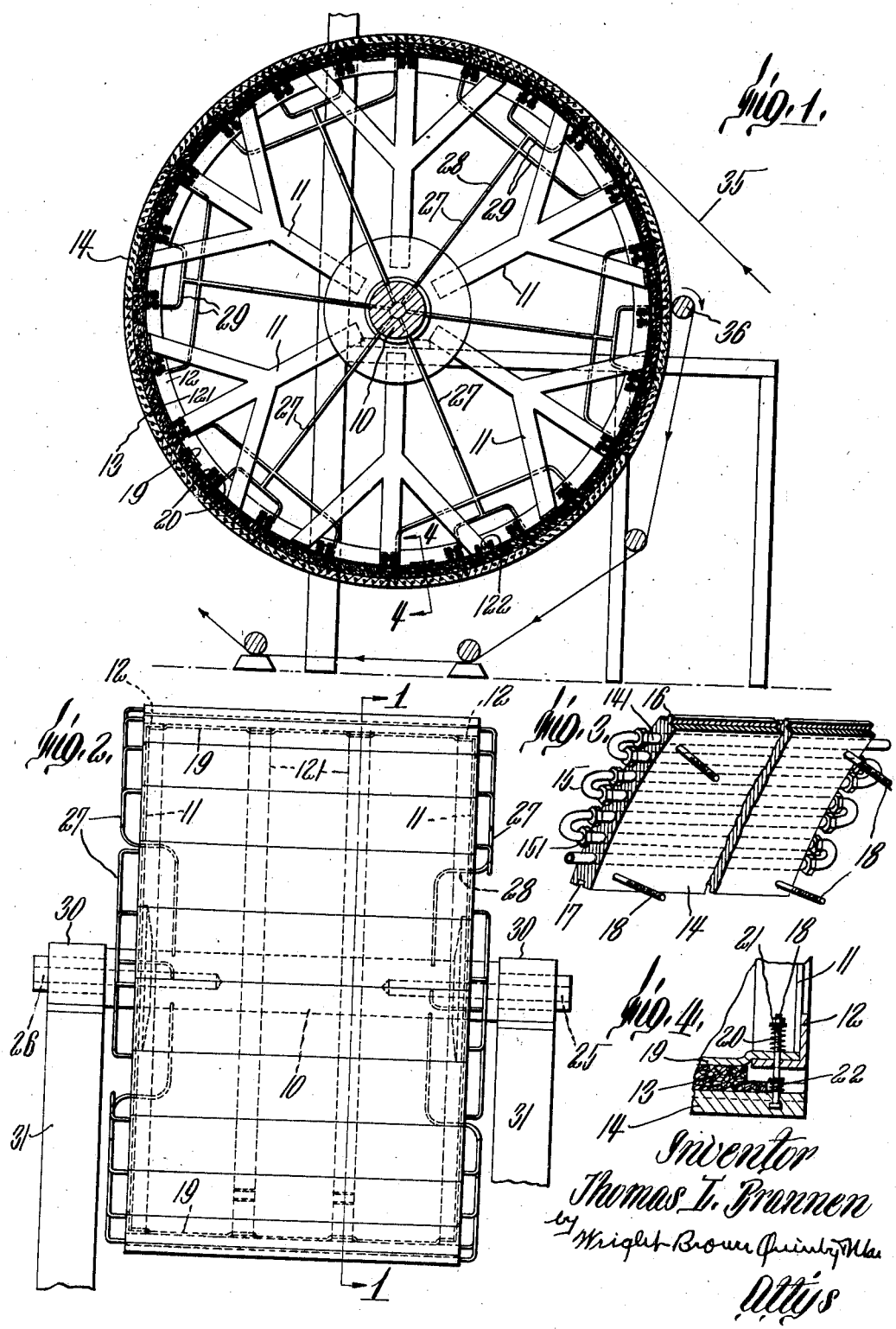

Patented Feb. 28, 1933

1,899,256

UNITED STATES PATENT OFFICE

THOMAS L. BRANNEN, OF BERLIN, NEW HAMPSHIRE, ASSIGNOR TO BROWN COMPANY, OF BERLIN, NEW HAMPSHIRE, A CORPORATION OF MAINE

DRIER ROLL

Application filed September 6, 1930. Serial No. 480,033.

This invention relates to a drier roll, preferably of considerable diameter, the object of the invention being the construction of a large roll capable of presenting a relatively continuous heated metal surface to a sheet to be dried thereon. To this end the heated surface may be formed by a number of separate blocks of metal which are included in the peripheral portion of the roll, steam pipes being cast into these blocks for the purpose of providing heat for them. Provision is also made for insulating the inner surface of the peripheral blocks to prevent loss of heat therefrom.

For a more complete understanding of the invention reference may be had to the description thereof which follows and to the drawing, of which,—

Figure 1 is a sectional view of a roll embodying the invention taken on the line 1—1 of Figure 2.

Figure 2 is a side elevation of the roll shown in Figure 1.

Figure 3 is a perspective view of one of the peripheral blocks of the roll.

Figure 4 is a fragmentary section on the line 4—4 of Figure 1.

Referring to the drawing in detail, the roll may comprise a central shaft 10 from which extend a pair of spiders composed of outwardly branching spokes 11. One or more additional spiders may be employed for rolls of greater axial lengths than that illustrated on the drawing. Each spider supports a ring 12, these rings being preferably made of angle iron. These rings support a series of curved blocks 14 which are placed edge to edge and form the cylindrical shell of the roll. Each block is cast about a number of short lengths 141 of pipe which are held parallel to one another in a suitable jig for the purpose. After the casting has cooled, the pipe sections may be serially connected by U-bends secured to the projecting pipe ends by union couplings 151. Each block 14 is thus provided with a steam coil embedded therein by which it may be efficiently heated. To maintain good contact between the blocks and the pipes cast therein, the metals used for these parts are preferably selected with approximately equal coefficients of thermal expansion.

When the roll is in use, a sheet to be dried is brought into contact with its periphery, that is, the outer surface of the blocks 14. To minimize loss of heat from the inner surface of these blocks I may provide a layer of suitable thermal insulating material 13, such as blocks of an asbestos compound. This lagging may be held in place by a number of split rings 121, the ends of which may be pressed apart as by springs 122 to press the rings against the lagging. The rings 121 may also be assisted by cross bars 19.

Each block may be formed with a tongue 16 and a groove 17 which are of sufficient length and depth to remain in adjacent grooves and tongues respectively when the blocks 14 are cold. These tongues and grooves aline accurately the abutting edge faces of the blocks 14 so as to present a smooth, continuous surface on the outside of the roll. In order to hold the blocks 14 in place, each block may have the heads of a suitable number of bolts 18 cast therein. These bolts each extend inwardly through one of the rings 12 and carry compression springs 20 between the inner surface of the ring 12 and a suitable nut 21 on the inner end of the bolt. The bolts each carry also a spring 22 between the block 14 and the ring 12. When the blocks are heated, the cylinder they form expands outwardly, compressing the springs 20 which thereupon maintain the blocks uniformly spaced from the rings 12. When the blocks are cooled, the springs 22 engage the rings 12 and keep the blocks uniformly spaced therefrom. The cylindrical shape formed by the blocks is thus maintained at all temperatures. Since the frame of the roll is thermally protected from the heated outer layer formed by the blocks 14 by the lagging 13, the variation of temperature of the rings 12 is relatively small.

Steam or other heated fluid may be supplied to the steam coils in the several blocks by any suitable means. As shown, the shaft 10 is drilled inwardly from both ends as at 25, 26. This provides an inlet at one end of the shaft and an outlet at the other end through the bearings in which the shaft rotates. From the bore 25 a number of pipes 27 may extend radially, each of these pipes having a stretch 28 extending substantially parallel to the axis of the shaft. From the stretch 28 the pipes may branch as at 29 to the several coils 15. A similar system of piping extends from the bore 26 to the opposite ends of the several coils 15, so that steam or other heating fluid entering through the bore 25 or 26 may thus pass through each of the coils and be discharged through the opposite bore. The stretch 28 lends flexibility to each of the pipes 27 for the purpose of compensating for radial expansion of the steam pipes when heated.

The roll may be mounted for use in suitable bearings 30 supported on a frame 31. The roll is particularly adapted for the drying of sheets having a relatively low mechanical strength, the large circumference of the roll permitting the sheet to be in engagement therewith for a considerable interval of time without necessitating excessively slow speed of sheet travel. To this end the sheet 35 may be guided to and from the roll in such a manner that substantially all of the circumference of the roll is engaged thereby. For this purpose a suitable guide roll 36 may be mounted to take the sheet from the roll at a point closely adjacent to the point of initial contact of the sheet with the roll.

I claim:

1. A drying roll comprising a plurality of blocks held edge to edge in the form of a hollow cylinder, a rotatable supporting frame within said cylinder, means resiliently connecting said blocks with said frame, means for heating said blocks, and a cylindrical layer of heat insulating material against the inner surface of said cylinder.

2. A drying roll comprising a plurality of blocks held in the form of a hollow cylinder, said blocks having tongued and grooved abutting edges, a supporting frame within said cylinder, said frame including a shaft, a plurality of rings concentric with said shaft and spokes connecting said rings to said shaft, and means for resiliently connecting said blocks with said frame, said means comprising bolts extending inwardly from each said block through said rings, a nut on the inner end of each said bolt, and a pair of compression springs on each said bolt, one of said springs being between the adjacent block and ring, the other said spring being between the adjacent ring and nut.

In testimony whereof I have affixed my signature.

THOMAS L. BRANNEN.